2,777,150

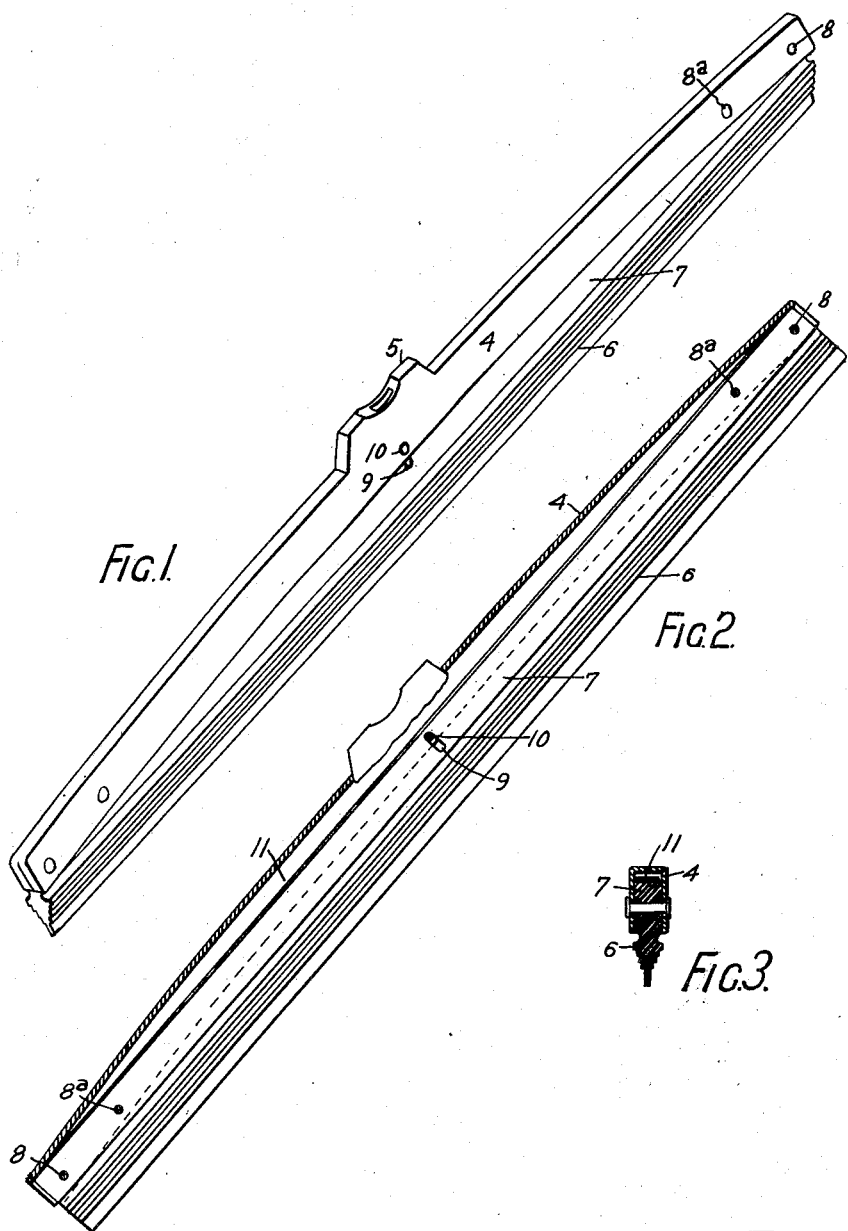

WINDSHIELD WIPER FOR A CURVED WINDSHIELD

Kenneth Joseph Laffan, Kingsford, near Sydney, New South Wales, and Leonard Gladwin Robinson, Sydney, New South Wales, Australia Application November 20, 1953, Serial No. 393,482

Claims priority, application Australia November 27, 1952

1 Claim. (Cl. 15—245)

This invention relates to automobile windshield wipers and particularly for those automobiles having curved windshields. In order to conform to the varying contour of the windshield it has been necessary hitherto to make the windshield wiper blade holder of a number of articulated parts of a number of parts pivotally mounted on a common base member. The wiper blade of rubber or the like is mounted in the several holder parts.

The invention has been devised to provide a windshield wiper, that is the holder and the blade, for curved windshields which does not require a holder made of a number of articulated or pivotally mounted parts. The windshield wiper of this invention is as effective as those used hitherto and it is cheaper to make.

The invention is described with reference to the annexed drawings wherein Fig. 1 is a perspective view of the windshield wiper; Fig. 2 is a longitudinal central sectional elevation of the holder with the blade shown in elevation; Fig. 3 is a transverse section.

This windshield wiper has a channel section holder 4 curved longitudinally to approximate the maximum curvature of the windshield. Conventional means indicated at 5 are fixed on the back of the holder at the center to mount the holder on a conventional actuating arm (not shown).

A blade 6 has a backing or shank 7 slidably housed in the holder. The shank is pivotally anchored as at 8 in each end of the holder. There is sufficient tension on the blade to pull the edge into a straight line when not in contact with a curved surface. When in contact with a curved surface the blade will conform thereto by sliding in the channel. The channel forms a guide for the blade.

The blade may have one or more transverse slots 9 in the shank 7 (one only is shown) and a pin 10 slidable in the slot is fixed in the walls of the holder. The pin prevents the blade being forced out of the channel.

A leaf spring 11, preferably slightly arcuate, is housed in the channel to bear on the back of the blade shank. It is adapted to thrust the blade outwardly. The spring maintains the blade in wiping contact with the windshield.

This windshield wiper will effectively wipe a flat surface as well as a curved surface.

In some windshields the curvature is such that it is desirable, in order to improve the wiping action of the blade, to secure the blade rigidly in the ends of the holder. In these cases the pivotal anchorage 8 is made a rigid anchorage. An additional anchoring pin indicated at $8a$ may also be employed at a short distance, for example, one inch, from each end. Where such additional anchoring pins are employed the part of the blade shank gripped thereby is forced into the holder against the resistance of the spring and the end parts of the blade conform to the curvature of the holder. Movement of the blade is restricted to the part between the pins $8a$. Other gripping means may be substituted for the pins.

We claim:

A windshield wiper comprising an elongated flexible blade, a channel section holder curved longitudinally and coextensive with said blade to snugly house the blade therein, means at each end of said housing to anchor the blade therein, means defining a transverse slot centrally in said blade, a pin fixedly mounted in said holder in registry with said slot and slidable therein to afford transverse flexure of said blade, a leaf spring housed in said holder bearing against the back of said blade to bias the latter outwardly of said holder, said pin being operable to maintain said blade in said holder against the bias of said leaf spring, and means on said holder for mounting said holder on an actuating arm.

References Cited in the file of this patent

UNITED STATES PATENTS

| 2,254,343 | Zierer | Sept. 2, 1941 |
| 2,658,223 | Enochian | Nov. 10, 1953 |
| 2,659,097 | Morton | Nov. 17, 1953 |
| 2,672,641 | Scinta et al. | Mar. 23, 1954 |